UNITED STATES PATENT OFFICE.

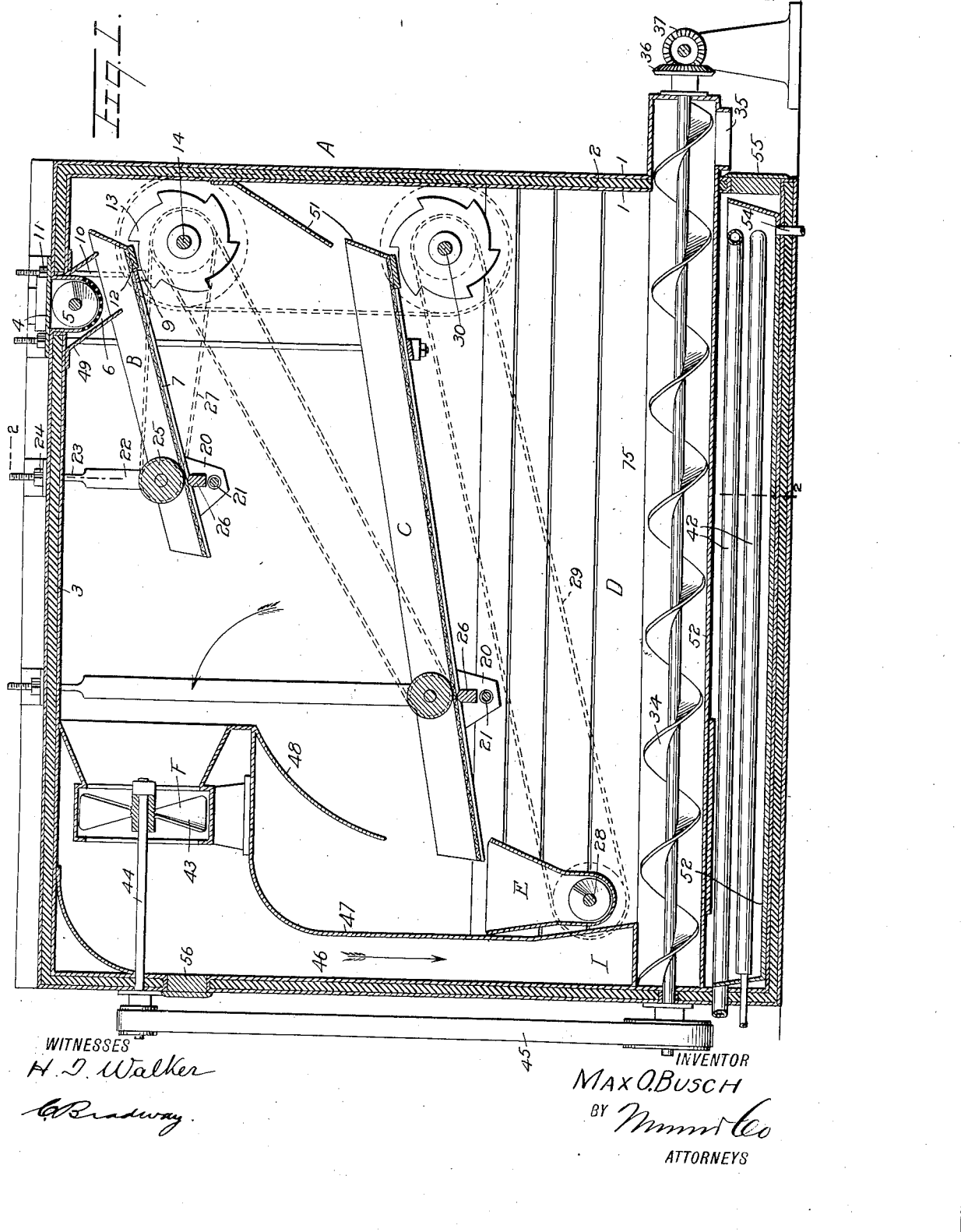

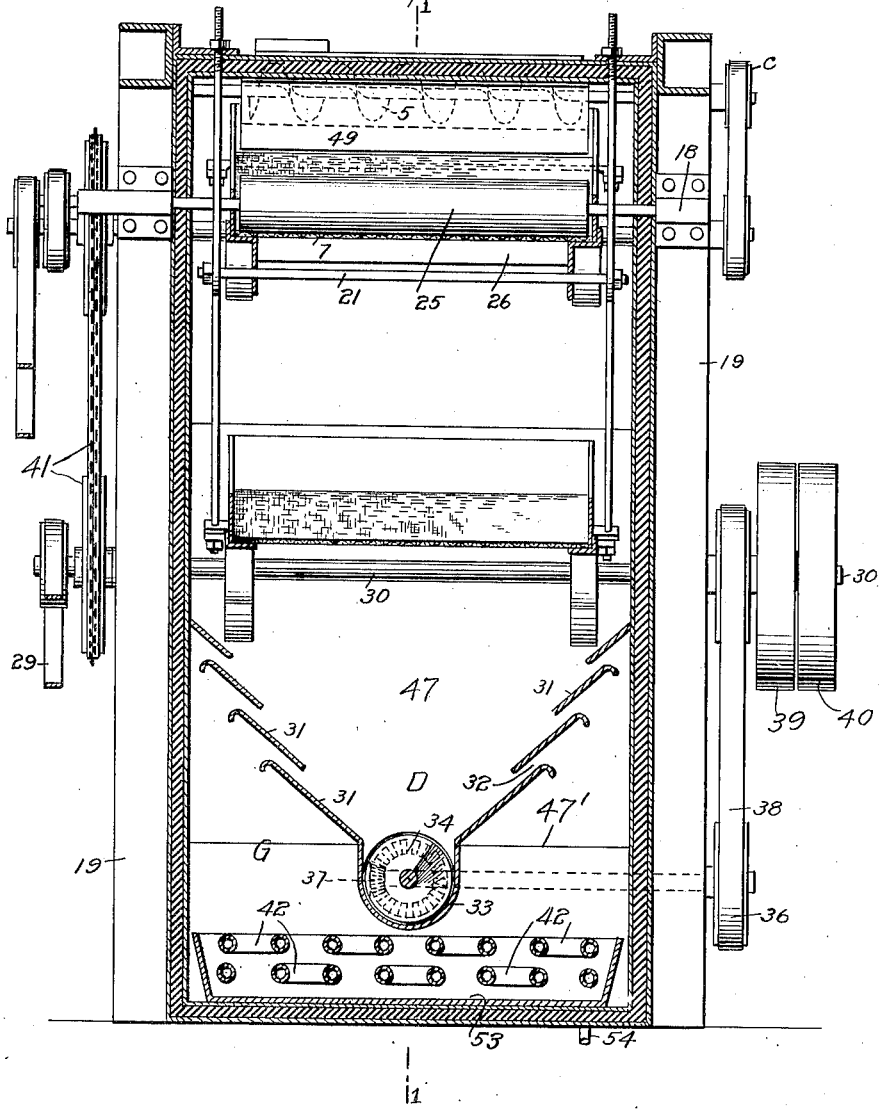

MAX OSCAR BUSCH, OF NEWARK, NEW JERSEY.

MACHINE FOR COOLING FINISHED OR UNFINISHED COCOA-POWDER.

1,107,028.  Specification of Letters Patent.  Patented Aug. 11, 1914.

Application filed May 1, 1913. Serial No. 764,778.

*To all whom it may concern:*

Be it known that I, MAX O. BUSCH, a citizen of the United States, and a resident of Newark, in the county of Essex and State of New Jersey, have invented a new and Improved Machine for Cooling Finished or Unfinished Cocoa-Powder, of which the following is a full, clear, and exact description.

This invention relates to the art of cocoa making, and has to do more particularly with the cooling of the finished cocoa powder when it is reheated for the purpose of producing a darker product, or for cooling the unfinished powder received from the crushers.

The invention has for its general object to provide a machine of the character referred to which is thoroughly reliable and efficient in use, so designed as to have a large capacity and comparatively inexpensive to manufacture and keep in repair and operation.

Another object of the invention is the provision and the employment of means for screening the powder and simultaneously cooling the same, the cooling being effected by air at a suitably low temperature which is caused to circulate upwardly through the falling powder at such a velocity that the powder will not be carried upwardly with the air currents but allowed to deposit into a suitable discharging means.

A further object is the provision of an air circulating system including means for artificially cooling the air within the machine, in which case the air is used over and over again by circulating in a closed circuit; or when external air is at a sufficiently low temperature the artificial cooling means may be thrown out of operation and atmospheric air drawn into the machine.

With these objects in view, and others as will appear as the description proceeds, the invention comprises various novel features of construction and arrangement of parts which will be more fully described hereinafter and set forth with particularity in the claims appended hereto.

In the accompanying drawings, which illustrate one embodiment of the invention, and wherein similar reference characters are employed to designate corresponding parts throughout both views, Figure 1 is a vertical longitudinal section of the machine; and Fig. 2 is a transverse section thereof.

Referring to the drawing, A designates the casing of the machine, which casing is so constructed as to inclose a substantially air-tight chamber, and the walls and top are made of two thicknesses of metal 1 with a cork or other filling 2. At the top 3 is an opening 4 into which the cocoa powder is fed, there being a helical feed screw 5 under the said opening for conveying the cocoa along a distributer in the form of a perforated trough or box 6 carried by the top 3 of the casing. This box or trough is made of sheet metal with three-quarter inch perforations therein, whereby the cocoa is distributed onto the upper end of the inclined vibratory screen B, which consists of a rectangular frame 7 of angle-iron, to which a brass wire screen or netting 8 is secured of sixteen mesh when the machine is used for cooling finished cocoa. For cooling unfinished cocoa the mesh of the screen B will be somewhat larger. This screen is supported at its upper end on a horizontal bar 9 which is suspended on the lower ends of rods or bolts 10 which have their threaded ends passing through the top 3 of the casing and provided with nuts 11 whereby the bolts can be drawn upwardly or allowed to move downwardly, whereby the position of the shoes 12 on the upper corners of the screen may be adjusted with respect to the teeth of the rotary agitators or wheels 13, which wheels are fastened to a horizontal shaft 14 journaled in bearings 18 at the sides of the casing, these bearings 18 being fastened to upright channel irons or equivalent supports 19 at the sides of and external to the casing. The lower end of the screen is provided at its sides with bearing ears 20 through which passes a pivot shaft 21 that is mounted in the lower ends of hangers 22 that are provided at their upper ends with bolts or threaded stems 23 passing through the top 3 and provided with nuts 24, so that by turning the nuts in one direction or the other the lower end of the screen can be raised or lowered for changing the inclination of the screen, according to the rapidity of the feed of the powder desired. Coöperating with the lower end of the screen is a crushing roll 25 carried by the hangers and so arranged that it will have contact with the upper surface of the netting 8 of the screen, the said netting being supported from underneath by a bar 26 vertically under the axis of the crushing roller 25, so that the coarse material that fails to pass through the screen will, before discharging off the latter, be subjected to a crushing or pulverizing action. The crushing roller 25 can be driven in any suitable manner, as, for instance, by a belt transmission 27 between the agitator shaft 15 and the roll.

A second screen C which is finer than the screen B, is mounted below the latter and operates at a less inclination. This screen is supported and agitated independently of but in the same manner as the screen B, and the supporting and actuating means are designated by the same reference characters that are employed in connection with the supporting and actuating means of the screen B. The powder that passes through the screen C is collected in a V-shaped hopper or trough D, but the coarse material that does not pass through the mesh of the screen drops off the lower end of the latter into a tailing or discharge trough E in which is mounted a screw conveyer 28 that is driven by a belt or equivalent transmission 29 from the shaft 30 for the agitators of the lower screen. The screen C being of less inclination than the screen B is somewhat longer so that a sufficient length of time is provided for the powder to be thoroughly screened without danger of fine powder being discharged with the tailings.

The V-shaped hopper or chamber D has each side made up of a series of plates 31 disposed one above another with a passage or port 32 between the lower portion of one plate and the upper portion of an adjacent plate, the plates overlapping sufficiently so that material dropping on the plates will pass from one plate to another until the material finally enters the box-like bottom 33, wherein is mounted a discharge screw or equivalent conveyer 34 that moves the cooled powder forwardly to discharge from an outlet 35 where the cocoa is dropped into a suitable receiver. The forward end of the screw 34 is provided with a bevel gear 37 which meshes with a bevel gear that is driven by a belt 38 or equivalent means from the main drive shaft 30 on which are tight and loose pulleys 39 and 40, said shaft 30 operating through a sprocket and chain transmission 41 to deliver power to the shaft 14.

The purpose of the ports or longitudinal air inlet passages 32 in the sloping sides of the chamber D under the screens is to admit cool air into the bottom of the falling mass of cocoa powder, so that the air in rising will effectively cool the latter, the velocity of the air being so proportioned with respect to the weight of the cocoa powder that the latter will not be drawn upwardly by the air currents. In order to cool the air there is disposed in the bottom of the machine an artificial cooling means, such as refrigerator coils 42, or equivalent means.

Air is directed through and along the coils 42 and drawn upwardly through the cocoa powder by a fan F mounted at the top of the machine, at the rear portion, this fan being of any approved type and having its rotary element 43 mounted on a shaft 44 which is driven by a belt or other power transmitting means 45 from the rear end of the conveyer screw 34. The discharge side of the fan is connected by a vertically-extending duct 46, formed between the plate 47 and rear wall of the casing, with a chamber G formed below the hopper D, in which chamber G the cooling coils 42 are located. The air moves under the bottom edge 47' from the duct 46 to the chamber G and continues forwardly through the chamber G in contact with the cooling coils and rises therefrom and enters downwardly through the ports or passages 32 into the hopper or chamber D, thence passing upwardly through the cocoa powder as it drops from screen to screen, and from the latter screen to the bottom of the hopper D. Deflectors 48 and 49 are arranged under the fan F and adjacent the feeding device 4, so that a better circulation is provided, the deflector 49 serving to prevent a suction at the feeding opening, which would tend to draw in air from the atmosphere. Deflectors 50 and 51 at the upper ends of the screens also prevent air from circulating in portions where it is not needed, and serve further to direct the cocoa from falling by the upper end of the screens.

As the air delivered from the fan is somewhat heated by absorbing heat from the powder the heated air striking the portions of the coils adjacent the lower end of the duct 46 will cause the ice on the coils to melt, and in order to prevent vapor from rising directly from these coils into the cocoa powder a deflector 52 is arranged over the rear ends of the coils, whereby the air is directed forwardly into the chamber containing the coils before it rises to cool the cocoa powder. Under the coils is arranged a pan 53 which has a drain outlet 54 to collect any water that may form.

In case the external atmosphere is sufficiently cool as to permit the refrigerating coils 42 to be cut out of service a door 55 is opened at the bottom of the machine so that the fan F will suck air into and upwardly through the casing, which air is discharged out of a door 56 in the rear wall of the machine, but when the air is cooled by the coils 42 the machine is completely closed, so that the air circulating system is a closed circuit, the air being used over and over again and cooled once in each cycle.

From the foregoing description taken in connection with the accompanying drawings, the advantages of the method of operation and of the apparatus shown will be readily understood by those skilled in the art to which the invention appertains, and while I have described the apparatus which I now consider to be the best embodiment thereof, I desire to have it understood that the apparatus shown is merely illustrative, and that such changes may be made when desired as are within the scope of the appended claims.

Having thus described my invention, I claim as new and desire to secure by Letters Patent:

1. A cocoa powder cooling machine comprising a casing, means from which cocoa powder falls as a cloud, means for directing cool air laterally into the cloud at the bottom thereof, and means for causing an updraft of the cool air through the cloud with a force less than the gravitational force acting on the powder.

2. A machine of the class described comprising a casing, means within the casing for distributing cocoa powder, a hopper in the bottom of the casing to receive the powder in settling, said casing having downwardly discharging longitudinal air passages, and means for directing cooling air into the passages and producing an upward current of air through the falling cocoa powder.

3. A machine of the class described comprising a casing, means within the casing for producing a falling cloud of cocoa powder, a hopper in the bottom of the casing having downwardly discharging longitudinal air passages, means for directing cooling air into the passages and producing an upward current of air through the falling cocoa powder, and means in the bottom of the hopper for removing cooled powder therefrom.

4. A machine of the class described comprising a casing, means within the casing for producing a falling cloud of cocoa powder, a hopper in the bottom of the casing having downwardly discharging longitudinal air passages, air cooling means under the hopper, and means in the casing for forcing air through the cooling means to the said passages and thence upwardly through the falling powder.

5. A machine of the class described comprising a casing, a V-shaped chamber therein having its sides formed of plates disposed one above another and separated to form air inlet ports, means in the upper part of the casing from which cocoa powder falls into the said chamber, and means for causing cooling air to pass into the said chamber through the said ports and thence upwardly through the falling cocoa powder.

6. A cocoa cooling machine comprising a casing, means therein from which cocoa powder falls as a cloud, means for directing streams of cool air into the cloud from opposite sides, and means for causing an updraft of the cooled air through the cloud with a force less than the gravitational force acting on the powder.

In testimony whereof I have signed my name to this specification in the presence of two subscribing witnesses.

MAX OSCAR BUSCH.

Witnesses:
  CHATTEN BRADWAY,
  PHILIP D. ROLLHAUS.